Inventors:
Jean C. J. Blosse
Michel J. J. Blosse
by
Attorney

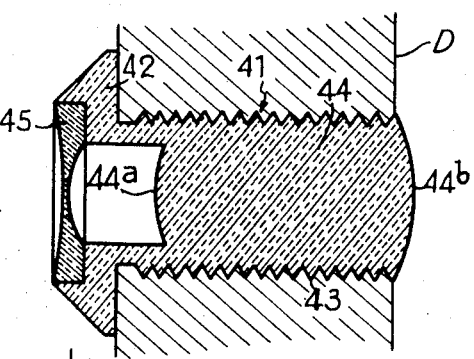
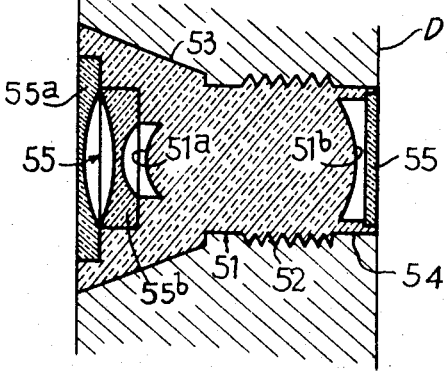
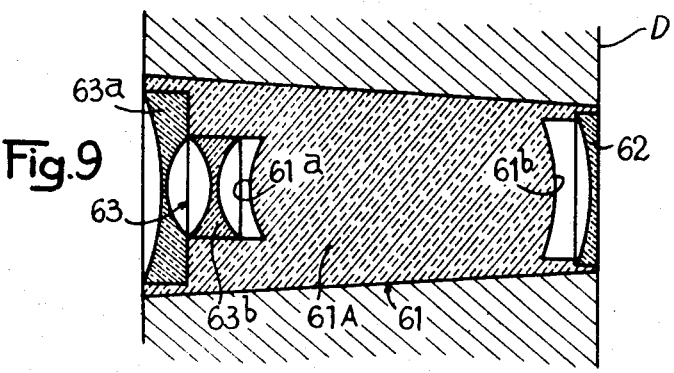

United States Patent Office 3,514,188
Patented May 26, 1970

3,514,188
OPTICAL SPYGLASS
Jean Charles Joseph Blosse and Michel Jean Joseph Blosse, both of 48 Boulevard Charles de Gaulle, Sannois, Val-d'Oise, France
Filed Feb. 1, 1966, Ser. No. 524,093
Claims priority, application France, Feb. 5, 1965, 4,483, 4,484
Int. Cl. G02b 1/04; G02h 25/04
U.S. Cl. 350—212                      1 Claim

ABSTRACT OF THE DISCLOSURE

Combination of a door or wall and a telescopic spyglass. The feature of the combination is that the spyglass consists of a transparent plastics block having a convergent lens portion at one end and a divergent lens portion at the other end. These lens portions are in one piece with the block. A hard wear-resistant transparent element secured to the block protects at least one of the lens portions.

---

The present invention relates in a general way to optical spyglasses comprising a viewer extending through an opaque wall, usually a door. These devices comprise a mount which carries the optical elements and has at the front end a flange adapted to bear against the outer face of the door; this mount is usually secured to the door by a sleeve or other securing member which co-operates with the rear part of the mount and is applied against the inner face of the door so as to lock the viewer and apply the flange against the door.

The object of the invention is to provide an improved optical spyglass which not only has optical advantages but can be produced by a cheap and rapid method. Another of the objects of the invention is to provide a viewer which permits constructing simple spyglasses of relatively low cost price particularly easy to mount.

The spyglass according to the invention comprises a thick dioptric block moulded in one piece from a transparent plastics material, said block having, moulded therewith, a rear converging lens portion and a front lens portion, at least one attached end element for the protection of at least one of the lens portions composed of a hard transparent material, such as glass, said protecting element being secured to one of the front and rear end faces of the block.

Preferably, said block comprises at the front and at the rear one or two respective cavities for accommodating the protecting element or elements.

Said spyglass has in its axial planes a profile which is such that it can be easily secured in or on the wall to be equipped; it can have for example a frustoconical shape so that when it is a force fit in a frustoconical housing of suitable form in the wall, it is maintained in position by a wedge action and constitutes in itself a complete optical spyglass or viewer.

According to another embodiment of the invention, the spyglass comprises a circular cylindrical portion provided with a screw thread moulded thereon which permits screwing the spyglass directly in an aperture in a wall composed of soft material, for example soft wood.

In order to facilitate the moulding of this block, the invention also teaches forming the screw thread or other securing means on another member which is permanently fixed to the block in the course of moulding or by any appropriate means such as an adhesive. If the spyglass has two protecting elements, one of these elements can be secured to this member instead of the block.

Each of the protecting elements of the lens portions of the block can be composed of a portion of glass having faces in parallel planes, similar to a disc. However, the invention also covers the arrangement in which one of the faces or each of the front and rear faces of this protecting element has such curvature that the element constitutes a diverging or converging dioptric device (lens or meniscus) which is combined with the corresponding lens portion moulded in the block.

The thick dioptric block of plastics material with its forward and rear lens portions could form with the protective element or elements the whole of the optical system; it could also constitute a converging ocular with which is associated a diverging objective secured to one of the ends of said block at a certain distance from the corresponding lens portion. This objective could constitute a protecting element, in which case it includes at least one lens composed of hard transparent material, such as glass.

Further features and advantages of the invention will be apparent from the ensuing description with reference to the accompanying drawings to which the invention is in no way limited.

Figure 1:
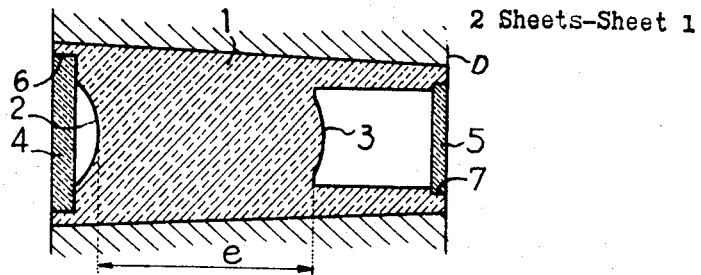
FIG. 1 is an axial sectional view of a first embodiment of an optical spyglass according to the invention.
Figure 4:
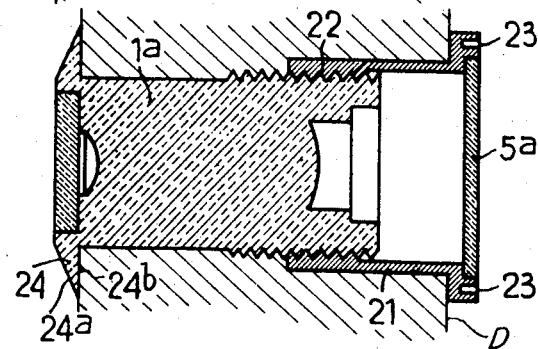
Figure 5:
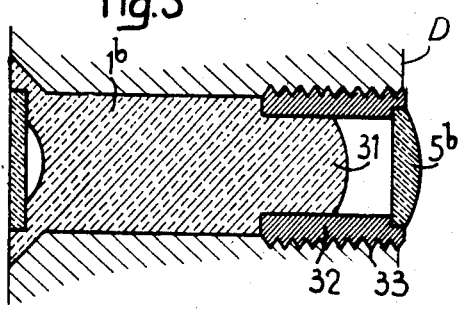
Figure 6:
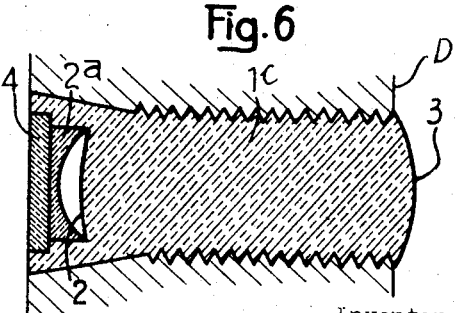

FIGS. 4, 5, and 6 are axial sectional views similar to FIG. 1 of three other embodiments of the invention;

FIG. 7 is an axial sectional view of an embodiment of the invention in which the ocular is composed of a thick moulded converging dioptric block and the objective consists of a single diverging lens of glass which is also a protecting element;

FIG. 8 is an axial sectional view of another embodiment of the invention in which the ocular consists of a thick moulded dioptric block defined at the front and at the rear by two lens portions having such curvatures that this block is convergent, this spyglass having a plane protecting element, and FIG. 9 is an axial sectional view of another embodiment of the invention in which the ocular consists of a thick moulded dioptric block and a lens, the latter also serving as a protecting element.

The embodiment shown in FIG. 1 is a particularly simple example of an optical spyglass which constitutes in itself a complete optical spyglass unit mounted in an aperture of an opaque member such as a door D.

This spyglass comprises a block 1 composed of transparent plastics material defined by a frustoconical surface of revolution of small conicity. Its ends consist of two lens portions, the front or objective lens portion 2 being divergent and giving an upright image of the viewed object which is magnified by the rear lens portion or ocular lens portion 3 which is convergent. This image is viewed through the mass of the block having a thickness $e$ which therefore constitutes a transparent strip having parallel faces, the index of refraction $n$ producing an image shift of $$e\frac{n-1}{n}$$

As the plastics material has a relatively soft consistency and is easily damaged by scratching or oxidations the dioptric block is provided with protecting elements 4, 5 of a hard transparent material, for example glass. These elements have the shape of cylindrical discs and are disposed in cavities 6, 7. The block 1 is in a single piece obtained by moulding. The glass elements 4, 5 can be forced into the cavities 6, 7 or they can be secured to the block when moulding the latter.

Such a spyglass can be mass-produced at particularly advantageous selling prices. It constitutes a complete optical spyglass or viewer which, when forced into an aperture of suitable shape and dimensions having a slight conicity equal to or less than that of the spyglass, becomes rigidly blocked therein by a wedge action and therefore requires no other fixing means and no special tools for mounting.

This embodiment can be modified in various ways. In particular, the glass protecting elements 4 and 5 can have curved faces so as to constitute lenses or meniscuses of any suitable type and power whose action is combined with that of the moulded lens portions thereby improving the quality of the optical system.

Figure 2:
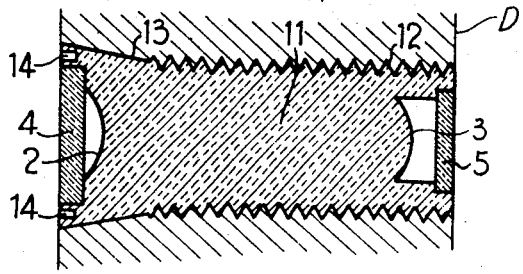
FIG. 2 is an axial view similar to FIG.1 of a second embodiment of the invention.
Figure 3:
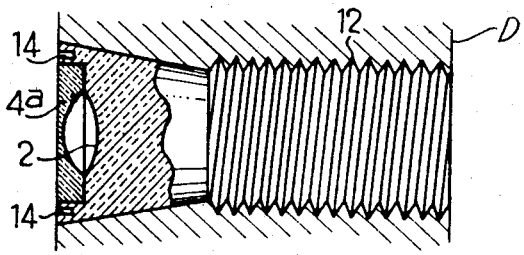
FIG. 3 is an elevational view, partly in section, of a variant of the invention.

Each of the classes or viewers shown in FIGS. 2 and 3 can also constitute in itself an optical spyglass mounted in the aperture of a member such as a door D.

In these spyglasses, the block 11 has a cylindrical rear portion having a screw thread 12 and a frustoconical front portion 13 which bears in the position of use against the inner face of an opening of suitable shape and dimensions.

The elements protecting the lens portions 2 and 3 are (FIG. 2) glass discs having parallel plane faces or elements having curved faces (meniscuses or lenses), the front element being preferably divergent and the rear element preferably convergent. By way of example, FIG. 3 shows an optical spyglass in which the front protecting element 4a is a plane-concave lens whose plane face is on the outside.

A spyglass such as one of those shown in FIGS. 2 and 3 can be screwed in an aperture formed in a wall of a soft material, such as soft wood. For this purpose there can be provided in the front face of the spyglass two blind holes 14, 14 whereby the block can be rotated by means of a key having lugs of suitable size.

The screwthread 12 can also be employed (FIG. 4) for maintaining the spyglass in a cylindrical aperture in any material or in a hollow door having a double wall, by means of a clamping collar 21 provided with a tapped thread 22. The turning holes are then provided at 23, 23 on this collar. The screwthread 12 can also be replaced by a smooth cylinder sliding in a smooth collar having a corresponding inside diameter.

In these two cases the rear protecting element 5 can be fixed at 5a to the collar instead of to the block 1a.

The shape of the front portion of the block can be frustoconical as in the embodiments shown in FIGS. 2 and 3; it can also be cylindrical and have a flange 24 having a frustoconical front face 24a and an annular and plane rear face 24b adapted to be applied in the course of tightening against the front face of the wall.

The embodiment shown in FIG. 5 has for main object to facilitate the moulding of the block 1b of plastics material by replacing the screwthreaded portion by a smooth cylindrical spigot 31 on which can be secured a cylindrical sleeve 32 having a screwthread 33. This sleeve can be fixed by any means to the spigot 31, for example by a drive fit and/or an adhesive; a set of grooves preventing relative rotation of the two members can be provided on the spigot 31 and the sleeve 32.

The rear protecting element 5b having plane or curved faces can be carried by the moulded block 1b as in the embodiment shown in FIGS. 1, 2, 3, or by the fixed sleeve 32. This unit consisting of the assembly of the members 1b and 32 can be directly screwed into the aperture formed in the wall or cooperation with a screwthreaded sleeve as in the embodiment shown in FIG. 4. Screwing holes similar to the holes 23 in FIG. 4 can be provided either on the block 1b or on the screwthreaded sleeve if the latter is utilized. In this case, two notches can be formed in the same axial plane whereby this sleeve can be screwed and blocked in position by a coin.

The spyglass in FIG. 6 comprises between the front protecting element 4 of any type and preferably of large diameter and the front diopter 2 of the block 1c a second lens 2a of any type of plastics material or glass capable of modifying advantageously the optical characteristics of the objective of the spyglass. For example, the front divergent diopter can have a plane or an approximately plane surface so that the hollow of a divergent lens placed in front of this diopter forms therewith a plane-convex or slightly bi-convex air lens or meniscus.

In the embodiment shown in FIG. 7, the spyglass comprises a moulded body 41 which also constitutes the mount and comprises a front flange 42 and a screwthread 43.

The optical system comprises the dioptric block 44 which is a portion of the body 41 and has two convergent diopters 44a and 44b, and an objective 45 which consists of a biconcave lens of glass or other hard transparent material which also performs the function of a protecting element for the diopter 44a.

The spyglass shown in FIG. 8 comprises as its ocular a dioptric block 51 which is convergent and composed of moulded material having two convex diopters 51a, 51b and a screwthread 52. This block is extended at its front end by a portion 53 having a frustoconical outer face and at the rear by a circular cylindrical annular portion 54 in which is inserted a protecting element 55 having parallel faces composed of glass or other hard transparent material.

The front portion 53 carries the objective 55 which is a compound divergent objective and includes a plane-concave lens 55a and a bi-concave lens 55b. These lenses can be of plastics material but preferably they are, or at least the outer lens 55a is, of a hard transparent material, for example glass, so as to serve as a protecting element.

The eyepiece shown in FIG. 9 comprises a convergent ocular 61 including a block 61A having two diopters 61a and 61b and a lens 62 and an objective 63 having two biconcave lenses 63a and 63b. In this embodiment the hard glass protecting element consists of the lens 62 so that the ocular formed by the dioptric block 61A and the lens 62 is convergent.

The glasses or any other dioptric protecting element employed in the spyglass described above can undergo any treatment applicable to mirrors and lenses for the purpose of modifying the characteristics, this treatment being for example a colouring of the glass throughout its mass or an application of a thin transparent layer which may be coloured or a metallic layer (for example gold, silver, chromium aluminium) or other layer by a treatment under a vacuum or other process converting a transparent element into a reflecting, semi-reflecting or non-reflecting element.

Further, these glasses or dioptric protecting elements can be mounted in a fluidtight manner so that the absolute initial fluidtightness of the dioptric block is conserved.

Having now described our invention what we claim as new and desire to secure by Letters Patent is:

1. In combination, a substantially planar opaque member having a front face and a rear face and being formed with an aperture extending from said front face to said rear face, and a telescopic spyglass mounted in said aperture, said telescopic spyglass comprising a unitary elongated block of transparent plastic material having its longitudinal axis extending transverse to the plane of said opaque member and further having a central portion of circular cross sectional shape and a peripheral annular front end portion extending axially outwardly toward said front face from said central portion and having a seat formed at the free end thereof, a glass lens element mounted in said seat, the central portion of the front end of the block having a concave surface transverse to the axis of the block so as to function as a divergent focussing element, the seat being located in said annular portion so as to define an air space between said lens element and said concave surface, said lens element and concave surface acting as a divergent objective for said telescopic spyglass, the central portion of the rear end of the block having a convex surface transverse to said axis and acting as a convergent ocular for said telescopic spyglass, the longitudinal outer peripheral surface of said block defining a frusto-conical shape having a first conicity tapering rearwardly, said aperture in said opaque member having a frusto-conical shape of a second conicity tapering rearwardly equal to or less than said first conicity and said block being wedged into said aperture by axially exerted force on the front end of the spyglass, said block being received in said aperture for its entire length, whereby extraction of the telescopic spyglass from said aperture can be accomplished only by exerting axial force on the rear end thereof in a forward direction, so as to prevent unauthorized extraction.

References Cited

UNITED STATES PATENTS

| | | |
|---|---|---|
| 1,499,018 | 10/1922 | Hertel. |
| 2,345,889 | 4/1944 | Talbot _____ 350—252 |
| 2,346,002 | 4/1944 | Bennett et al. _____ 250—252 |
| 2,538,077 | 1/1951 | Blosse. |
| 2,540,953 | 2/1951 | Kessler. |

FOREIGN PATENTS 552,355  1/1923  France.

DAVID SCHONBERG, Primary Examiner

R. J. STERN, Assistant Examiner

U.S. Cl. X.R.

350—230, 252, 319